(12) United States Patent
Lohmar et al.

(10) Patent No.: US 9,049,035 B2
(45) Date of Patent: *Jun. 2, 2015

(54) METHOD AND DEVICE FOR RELIABLE BROADCAST

(75) Inventors: Thorsten Lohmar, Aachen (DE); Uwe Horn, Aachen (DE)

(73) Assignee: Telefonaktiebolaget L M Erisson (publ), Stockholm (SE)

( * ) Notice: Subject to any disclaimer, the term of this patent is extended or adjusted under 35 U.S.C. 154(b) by 589 days.

This patent is subject to a terminal disclaimer.

(21) Appl. No.: 13/418,673

(22) Filed: Mar. 13, 2012

(65) Prior Publication Data

US 2012/0174147 A1 Jul. 5, 2012

Related U.S. Application Data

(63) Continuation of application No. 10/597,956, filed as application No. PCT/EP2004/001545 on Feb. 18, 2004, now Pat. No. 8,230,093.

(51) Int. Cl.
*G06F 15/16* (2006.01)
*H04L 12/18* (2006.01)

(52) U.S. Cl.
CPC ......... *H04L 12/1868* (2013.01); *H04L 12/1881* (2013.01)

(58) Field of Classification Search
USPC .................................................. 709/227, 229
See application file for complete search history.

(56) References Cited

U.S. PATENT DOCUMENTS

2002/0087707 A1 * 7/2002 Stewart et al. ................ 709/230

* cited by examiner

*Primary Examiner* — Jason Recek

(57) ABSTRACT

The invention is embodied in a technique for broadcasting content data from a broadcaster (including a multicaster) to a plurality of clients. After a client receives content data from the broadcaster, a plurality of available proxy servers may be contacted for post-processing after the content data broadcast is determined. The client subsequently randomly selects one of the available proxy servers to contact for post-processing after the content data broadcast. The client may further randomly select a delay time within a contact interval for the selected proxy server, at which time the client contacts the selected proxy server at the delay time to initiate post-processing.

15 Claims, 2 Drawing Sheets

METHOD AND DEVICE FOR RELIABLE BROADCAST

RELATED APPLICATIONS

This application is a continuation of U.S. patent application Ser. No. 10/597,956 filed May 1, 2007, now U.S. Pat. No. 8,230,093 which is a 371 of International Application No. PCT/EP2004/001545, filed Feb. 18, 2004, the disclosures of which are fully incorporated herein by reference.

FIELD OF THE INVENTION

The current invention relates to communications. More specifically, the current invention relates to a technique for reliably delivering content data from a broadcaster to a plurality of clients.

BACKGROUND OF THE INVENTION

Broadcast (including multicast) transmissions of data (e.g., over Multimedia Broadcast Multicast Service "MBMS" bearers or over Digital Video Broadcast for handhelds "DVB-H") is an efficient technique for simultaneously delivering content data to a plurality of clients. However, as typical broadcast schemes are unidirectional, content data cannot be broadcasted in a reliable manner that ensures the integrity of the broadcasted content data. This unreliability is due, in part, to the fact that a receiving side (e.g., a client) cannot send information associated with received or missing data packets (or other information pertaining to the broadcast) during an ongoing broadcast session.

For small scale broadcasts of data, traditional error control techniques (e.g., point-to-point data repair) may be utilized, however, for large scale broadcasts, it is not feasible to scale up such techniques for use by a multitude of users. For example, performance degradation or even system failure may result from implosions that occur when a loss of a packet triggers simultaneous messages from a plurality of users or exposure that occurs when a plurality of recovery-related messages (e.g., retransmission of packets) are received by users that have not experienced any packet loss.

There are two types of conventional broadcast protocols that have been widely adopted, namely automatic repeat request ("ARQ") based protocols and forward error correction ("FEC") based protocols. With ARQ protocols, a sender retransmits data upon requests from a user. With FEC protocols, the data that is broadcasted is encoded to obtain some parity data that can be used to verify and, if needed, correct the broadcasted content data. In addition, hybrids of the ARQ and FEC protocols have also been proposed. While these techniques provide enhanced data delivery in some circumstances, the typical broadcast protocol uses a single multicast channel or group. In other words, all packet transmissions and retransmissions are conducted over a single broadcast channel. Each user therefore receives all of the retransmissions of a packet, even if it has previously received the correct form of the packet.

Another type of broadcast protocol that has been adopted is the Reliable Multicast Transport Protocol ("RMTP"). RMTP provides sequenced, lossless delivery of a stream of packets from a broadcaster to a group of users and is based on a multi-level hierarchical approach, in which the users are grouped into a hierarchy of local domains, with a Designated Receiver (DR) in each local domain. Users in each local domain periodically send acknowledgments (ACKs) to their corresponding DR, DRs send ACKs to higher level DRs, until the DRs in the highest level send ACKs to the broadcaster, thereby avoiding the ACK-implosion problem. DRs may also provide repair data to the users in response to request for retransmission of packets.

One significant drawback of conventional broadcasting and multicasting protocols is that they all operate in bi-directional systems. Therefore, such protocols cannot be used in connection with arrangements where the user receiving the broadcasted content data may not have an uplink to the broadcaster until after the broadcast has been completed. This limitation prevents such conventional broadcasting techniques from being implemented in applications such as mobile communications terminals (e.g., mobile phones) where system-wide constraints require that simultaneous bi-directional data transfer be minimized whenever possible.

Accordingly, it will be appreciated that there remains a need for a reliable technique for the bulk delivery of data over broadcast bearers that is scalable and allows for point-to-point data repair and other post-processing transactions.

SUMMARY OF THE INVENTION

The invention relates to a technique for broadcasting content data by a broadcaster to a plurality of clients. The transmission of the content data occurs in two stages, a first broadcast stage in which content data is broadcast over an unreliable downlink-only communications pathway. After the broadcast stage has been completed, the clients are bi-directionally coupled to at least one proxy server to initiate one or more post-processing transactions, such as transmitting acknowledgments, repairing missing file segments, retrieving rights objects, replying to interactive prompts (e.g., requests to vote on a subject), and the provision of additional content relating to the broadcast.

The invention may be embodied in a method for broadcasting content data from a broadcaster to a plurality of clients. The method comprises the steps of receiving, by a client, broadcasted content data from the broadcaster, determining, by the client, a plurality of available proxy servers that may be contacted for post-processing after the content data broadcast, randomly selecting, by the client, one of the available proxy servers to contact for post-processing after the content data broadcast, and contacting, by the client, the selected proxy server to initiate post-processing.

In some variations, the method may also include the steps of determining, by the client, contact intervals for each of the available proxy servers specifying the time period in which the proxy servers may be contacted after the broadcast, and randomly selecting, by the client, a delay time within the contact interval for contacting the selected proxy server. If these steps are incorporated, then the client contacts the selected proxy server to initiate post-processing at the delay time.

The term broadcasting used here also encompasses multicasting sessions (such as those used in connection with audio and video broadcasting), and a broadcaster may thus be configured as a multicaster. In multicasting sessions, messages or packets are broadcast to a selected group of clients (that may be situated on either a LAN (Local Area Network), WAN (Wide Area Network) or the Internet).

The post-processing may relate to various exchanges of messages relating to the integrity of the content data received by the client. For example, the method may also include the step of sending, by the client to the contacted proxy server, information pertaining to content data that has or has not been correctly received, including such as statistics identifying a list of packets within the content data that were not received, the number of missing packets within the content data, a list of packets within the content data that were received, and the number of received packets within the content data. This information may be used for steps such as sending, by the contacted proxy server to the client, information to reconstruct the content data, which may be followed by the step of sending, by the client to the contacted proxy server, a notification that the content data was either successfully or unsuccessfully reconstructed.

The post-processing may relate to a variety of transactions. For example, the method may further comprise the step of obtaining, by the client from a digital rights manager, permission or a rights object to access the content data (such as a might be needed to access a multimedia file). The method may also include the step of sending, by the client to the contacted proxy server, data pertaining to one or more responses by the client to prompts within the content data. Such prompts might relate to polling regarding various issues or it may be a request to purchase or receive further information regarding an object or service.

The content data may also contain URLs or other indicators indicating where further information complimentary to the content data or to an advertisement associated therewith may be accessed. With such variations, the method may also include the step of sending, by the client to the contacted proxy server, a request to obtain additional content data.

If it is expected that the post-processing transactions will include the repair of the content data, then the method may also include the step of providing, by the broadcaster to each of the proxy servers, at least a portion of the content data prior to the content data broadcast. This provision permits each of the proxy servers to cache or otherwise store the content data so that any requests for missing data segments may be promptly serviced.

Information associated with available proxy servers and the contact intervals for each availably proxy server, in some variations, is embedded in the content data. This information may be within a header and/or within a data format such as a FLUTE delivery table.

The method may also include the step of determining one or more proxy servers prior to the random selection based on an attribute of the client. This attribute may be the IP address, the subscription level of the client, or any other identifiable trait that can be used to differentiate the clients.

The method may also comprise the step of adjusting the number of availably proxy servers for subsequent broadcasts based on the number of post-processing transactions. This configuration may be incorporated into a self-learning or adaptive system which adjusts the lists of available proxy severs and/or the contact intervals associated with each in response to post-processing statistics.

The invention is also embodied in a computer program product, which may be embodied on a computer readable medium, that includes program code portions for performing any of the steps of any of methods provided herein when the computer program product is run on a computer system.

The invention may also comprise a system having a computer processor and a memory coupled to the processor, where the memory is encoded with one or more programs that may perform the any of the steps of any of the methods of the current invention.

In still another embodiment, the invention is embodied in an apparatus for receiving content data broadcasted from a broadcaster to a plurality of clients. Such an apparatus includes a reception unit for receiving broadcasted content data from the broadcaster, a determination unit for determining a plurality of available proxy servers that may be contacted for post-processing after the content data broadcast, a first random selection unit for randomly selecting one of the available proxy servers to contact for post-processing after the content data broadcast, and a contact unit for contacting the selected proxy server to initiate post-processing. In some variations, the determination unit further determines contact intervals for each of the available proxy servers specifying the time period in which the proxy servers may be contacted after the broadcast and the contact unit contacts the selected proxy server to initiate post-processing at a delay time. Such a configuration further includes a second random selection unit for randomly selecting the delay time within the contact interval for contacting the selected proxy server.

In another embodiment, an apparatus for broadcasting content data to a plurality of clients is provided that comprises a content data acquisition unit for acquiring content data for broadcast, a determination unit for determining which of a plurality of proxy servers may be contacted by the clients for post-processing, and a broadcast unit for broadcasting the content data to the clients along with a list specifying the proxy servers that may be contacted for post processing to permit the client to randomly select a proxy server for post-processing. Optionally, the determination unit of this apparatus determines contact intervals for each of the available proxy servers specifying the time period in which the proxy servers may be contacted after the broadcast, and the broadcast unit further broadcasts the contact intervals for each of the available proxy servers to permit the client to randomly select a delay time within the contact interval in which to contact to selected proxy server for post-processing. In addition, the determination unit may further determine one or more post-processing transactions that may be initiated by the clients.

In yet an additional embodiment, the invention is a system comprising at least one broadcaster for broadcasting content data and post-processing instructions, a plurality of clients for receiving the broadcast content data, a plurality of proxy servers for processing requests from the clients after the content data is broadcast where the post-processing instructions identify available proxy servers, and the plurality of clients randomly select and contact one of the available proxy servers for post-processing. The post-processing instructions may further specify contact intervals for each of the available proxy servers specifying the time period in which the proxy servers may be contacted after the broadcast, and the plurality of clients may contact the randomly selected proxy server at a randomly selected delay time for post-processing.

BRIEF DESCRIPTION OF THE DRAWINGS

In the following the invention will be described with reference to exemplary embodiments illustrated in the figures, in which.

DETAILED DESCRIPTION OF THE PREFERRED EMBODIMENTS

In the following description, for purposes of explanation and not limitation, specific details are set forth, such as particular sequences of steps and various configurations, etc. in order to provide a thorough understanding of the present invention. It will be apparent to one skilled in the art that the present invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described as a method, it may also be embodied in a computer program product as well as a system comprising a computer processor and a memory coupled to the processor, where the memory is encoded with one or more programs that may perform the methods disclosed herein.

Figure 1:
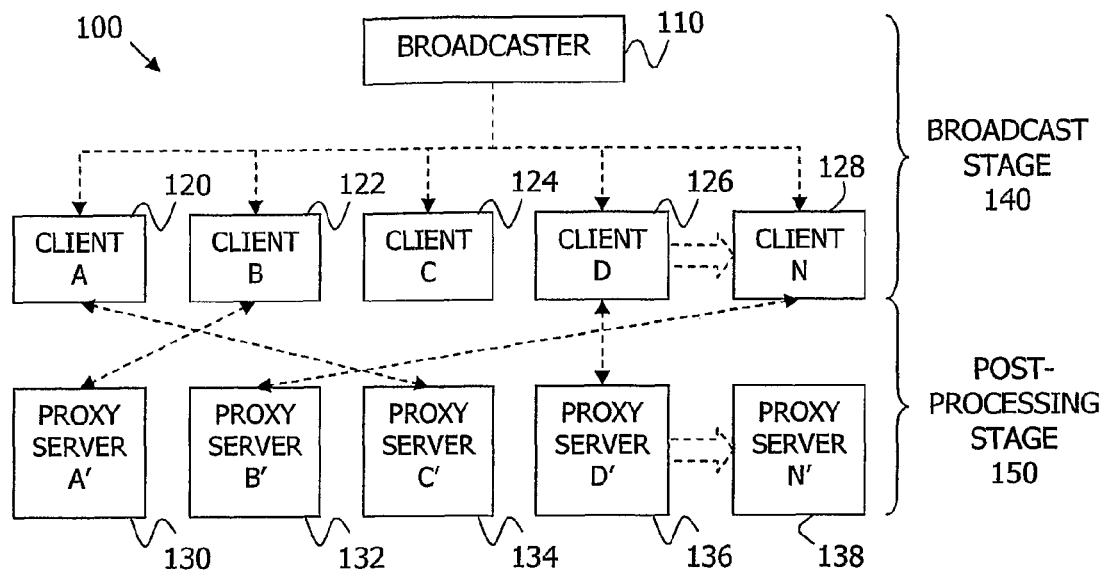
FIG. 1 is a schematic diagram useful for understanding and implementing the invention.

FIG. 1 illustrates an exemplary arrangement 100 in which the invention may be used including a broadcaster 110 that simultaneously broadcasts content data (such as a multimedia file or a portion thereof) to a plurality of clients 120, 122, 124, 126, 128. In general, the invention will be described in connection with two stages. First, a broadcast stage 140 where the broadcaster 110 broadcasts content data to the plurality of clients 120, 122, 124, 126, 128 (such as a broadcast over an unreliable downlink-only channel subject to significant packet losses). Second, a post-processing stage 150 that which, if desired, bi-directionally couples clients 120, 122, 124, 126, 128 with proxy servers 130, 132, 134, 136, 138 for post-processing purposes (a "server connect" procedure). Preferably, there are significantly fewer proxy servers 130, 132, 134, 136, 138 than clients 120, 122, 124, 126, 128 and it will be noted that only a portion of the number of clients may require post-processing transactions (e.g., client C 124 does not require any post-processing transactions and proxy server N' 138 is not contacted by any of the clients).

The broadcaster 110 or a server coupled thereto, may either before or during the broadcast stage 140 communicate with the proxy servers 130, 132, 134, 136, 138 in order to ensure that each proxy server has sufficient information to handle any post-processing transactions requested by a client 120, 122, 124, 126, 128. If the post-processing transaction relates to the repair of broadcasted file, then identical copies of the broadcasted file (or a portion thereof) are transferred to and cached at each proxy server 130, 132, 134, 136, 138, otherwise, the broadcasted file is not typically sent to the proxy servers.

The post-processing stage may facilitate a wide range of post-processing transactions including the acknowledgement of the error-free reception of a broadcast file (e.g., content reception reporting procedure). This acknowledgment information may be useful to the operator of the broadcaster 100 (e.g., the content provider) to determine the number of successfully delivered messages for accounting and trafficking purposes.

The post-processing stage may also facilitate the retrieval of missing segments (or packets) by the client 120, 122, 124, 126, 128 from one or more of the proxy servers 130, 132, 134, 136, 138. For instance, a client 120, 122, 124, 126, 128 may not have any uplink capability during the broadcast, and it is only after the broadcast has been completed that a repair phase may be initiated to reconstruct the file by obtaining the missing packets from a proxy server 130, 132, 134, 136, 138. It is important to note that in cases where the broadcasted content data was received without error by the client 120, 122, 124, 126, 128, there may be no need for the post-processing stage 150 (unless the post-processing stage is used to facilitate another non-repair transaction).

The content data may also contain interactive features seeking a response from the client user, such as a yes/no prompt, a request to purchase an advertised item or service (or to request additional information in connection therewith), and as a result, during the post-processing stage 150, the client 120, 122, 124, 126, 128 accessed a proxy server 130, 132, 134, 136, 138 to provide the requested response.

After completion of the post-processing stage 150, the client response may be used for a variety of purposes including political polls or to provide sales leads in response to advertisements associated with the content data.

In some cases, the post-processing stage 150 may be used to request additional content that is associated with the broadcast content date. For example, if the broadcasted content data is a standard audio/video commercial, but also included some URLs for further information, the client 120, 122, 124, 126, 128 may connect to a proxy server 130, 132, 134, 136, 138 which regulates access to the URLs. This mediction by the proxy server 130, 132, 134, 136, 138 can help prevent a Slashdot Effect where all of the clients 120, 122, 124, 126, 128 simultaneously seek to access a certain URL increasing the likelihood that the processing capabilities of all of the applicable web servers are consumed (resulting in a denial of service to some web site visitors).

The post-processing stage may also comprise the retrieval of a rights object for using the content of the broadcast file, such as from a digital rights manager (not shown) accessible by the client 120, 122, 124, 126, 128 via a proxy server 130, 132, 134, 136, 138. This retrieval may also be useful in lessening the likelihood of a Slashdot Effect by staggering the provision of the rights objects to each of the clients 120, 122, 124, 126, 128.

Figure 2:
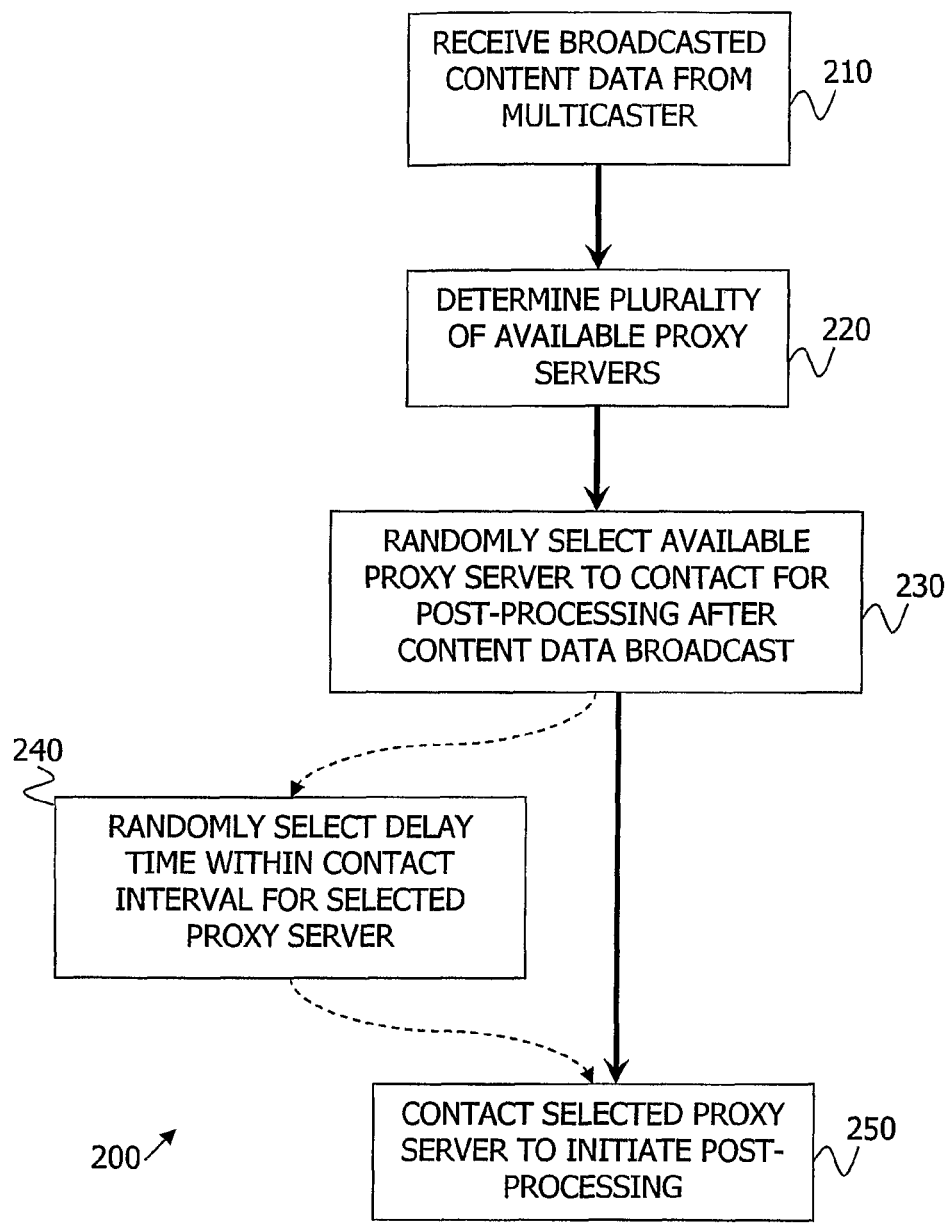
FIG. 2 is a process flow diagram of a method embodiment of the invention.

With reference to FIG. 2, a method 200 according to the current invention is shown. The method is useful in connection with broadcasting content data from a broadcaster to a plurality of users and commences, at step 210, with the receipt, by a client (user), of a broadcasted content from the broadcaster. Next, at step 220, the client identifies a list of available proxy servers to contact for post-processing. This determination may be made based on header information within the content data or it may be provided to the client in another known manner (either coincidentally or prior to the broadcast) such as via in-band transmissions. In some variations, the content data includes a File Delivery over Unidirectional Transport ("FLUTE") file delivery table, which can be used to specify the post-processing stage procedures (e.g., the method according to FIG. 2) such as available proxy servers (and the contact time intervals as described below) specified for each proxy server (see, for example, Paila et al., "FLUTE—File Delivery over Unidirectional Transport", IETF RMT Working Group, draft-ietf-rmt-flute-07.txt (Work in Progress), December 2003, which is hereby incorporated by reference).

At step 230, the client randomly selects an available proxy server to contact for post-processing purposes after the broadcast. Once the broadcast has been completed, the client contacts, at step 250, the selected proxy server to initiate a post-processing transaction.

Optionally, the determination at step 220, may also include a determination of a contact time interval in which each available proxy server must be contacted after the completion of the broadcast. With this variation, after the proxy server has been selected (at step 230), at step 240, the client randomly selects a delay time t within the contact time interval for the selected proxy server. At a minimum, the upper bound information is provided (i.e., the maximum amount of time after the broadcast in which the post-processing server connect must be established). If no lower bound information is provided (i.e., the minimum amount of time after the broadcast in which to initiate the connection between a client and a proxy server), then it will presumed to be zero (0) seconds. Once the broadcast has been completed and the delay time has expired, the client contacts, at step 250, the selected proxy server to initiate a post-processing transaction.

In some variations, the clients are arranged into classes, such as gold, silver, and bronze subscription users, where gold subscription users have the first opportunity to connect to a proxy server (e.g., the lower bound is five (5) seconds), the silver subscription users have the second opportunity to connect to a proxy server (e.g., the lower bound is fifteen (15) seconds), and the bronze subscription users have the last opportunity to connect to a proxy server (e.g., the lower bound is set at twenty-five (25) seconds).

It will also be appreciated that the available proxy servers may be determined on a client-by-client basis, or it may be made based on a class of clients. For example, clients having IP addresses within a certain range, may be provided with a list of is proxy servers within a certain proximity (e.g., "close" proxy servers). In addition, or in the alternative, the proxy servers may be made available based on the subscription level (e.g., gold, silver, bronze, etc.) of the clients, with better performing servers being provided to those clients having "preferred" subscription levels. Various conventional techniques may be utilized to distinguish between various clients using information other than an associated IP address. For example, see Jokela et al., "Host Identity Protocol: Achieving IPv4-IPv6 Handovers without Tunneling", in Proceedings of Evolute workshop 2003: "Beyond 3G Evolution of Systems and Services", University of Surrey, Guildford, UK, Nov. 10, 2003, which is hereby incorporated by reference.

The broadcaster may also harvest data regarding the post-processing transactions to optimize or otherwise adjust the number of proxy servers and their respective contact intervals for subsequent broadcasts. For example, if the broadcaster (or a central server coupled thereto) obtains information regarding the number of requests for missing data segments and the number of clients making those requests, or if it obtains information regarding the number of lost packets, then actions may be taken to limit such requests for future broadcasts (such as FEC optimization).

Figure 3:
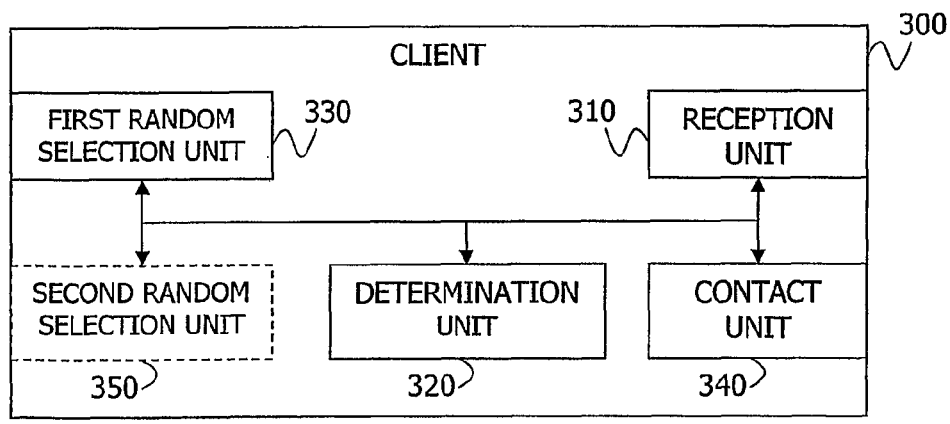
FIG. 3 is a schematic diagram of an apparatus embodiment of the invention.

FIG. 3 illustrates a sample apparatus 300 for receiving content data broadcasted from a broadcaster to a plurality of clients. The apparatus 300 includes a reception unit 310 for receiving broadcasted content data from the broadcaster, a determination unit 320 for determining a plurality of available proxy servers that may be contacted for post-processing after the content data broadcast, a first random selection unit 330 for randomly selecting one of the available proxy servers to contact for post-processing after the content data broadcast, and a contact unit 340 for contacting the selected proxy server to initiate post-processing.

In some variations, the determination unit 320 further determines contact intervals for each of the available proxy servers specifying the time period in which the proxy servers may be contacted after the broadcast. The apparatus 300 may also include a second random selection unit 350 for randomly selecting a delay time within the contact interval for contacting the selected proxy server where the contact unit 340 contacts the selected proxy server to initiate post-processing at the delay time.

The enhancements of the current invention are further illustrated in the following example which assumes that the content data file size is 2 MB, which corresponds to is a two minute video clip encoded at 128 kbps plus 10% redundancy for FEC protection. It is also assumed that there are 32 proxy servers (repair proxies) each of which can handle 700 requests per second (RPS) and the time interval in which the delay time is randomly selected is specified at 60 seconds. With this configuration, the total number of requests that can be handled may be calculated as:

$$700 \text{ requests per second}*60 \text{ seconds}*32=1{,}344{,}000 \text{ requests}$$

If each client requests additional data with an average size of 20 KB (corresponding to an average data loss of 1%), and if each client is connected at a maximum link speed of 30 kpbs, the required peak rate per server is approximately 700*30,000 0 21 Mbps.

If it is assumed that only 25% of the client users will perceive a data loss, the desired configuration may be implemented in connection with a total of 5,376,000 clients. If each client must download a rights object after the broadcast, the total number of clients would be limited 1,344,000, however, this number may be increased by lengthening the delay time and/or by increasing the number of repair proxies.

As can be appreciated, there are many advantage of the current invention, the main one being its scalability. As the required number of proxy servers and the time interval in which a client waits to connect to the client may be adjusted according to the number of expected clients requiring post-processing transactions (such as data repair which is dependent on the transport quality of the MBMS bearer and the utilized FEC operation), the current invention may be implemented with a small number of proxy servers which are subsequently increased based on past usage statistics.

While the present invention has been described with respect to particular embodiments (including certain system arrangements and certain orders of steps within various methods), those skilled in the art will recognize that the present invention is not limited to the specific embodiments described and illustrated herein. Therefore, while the present invention has been described in relation to its preferred embodiments, it is to be understood that this disclosure is only illustrative. Accordingly, it is intended that the invention be limited only by the scope of the claims appended hereto.

The invention claimed is:

1. A method of broadcasting content data from a broadcaster to a plurality of clients, the method comprising each of the plurality of clients:
   receiving broadcasted content data from the broadcaster;
   determining one of a plurality of available proxy servers that may be contacted for post-processing after the content data broadcast, the plurality of available proxy servers having received sufficient information, from the broadcaster, to handle any of the post-processing transactions requested by the each client;
   randomly selecting one of the plurality of available proxy servers to contact for post-processing after the content data broadcast; and
   contacting the selected proxy server to initiate post-processing.

2. The method of claim 1, further comprising a list of the plurality of proxy servers being provided according to proximity to the each of the plurality of clients.

3. The method of claim 1, wherein availability of better performing servers are provided to the each client based on the paid subscription level.

4. The method of claim 1, further comprising the each of the plurality of clients:
   determining contact intervals for each of the available proxy servers which specify the time period in which the proxy servers may be contacted after the broadcast;

randomly selecting a delay time t within the contact interval for contacting the selected proxy server; and contacting the selected proxy server to initiate post-processing at the delay time t.

5. The method of claim 1, further comprising the each of the plurality of clients sending to the contacted proxy server, information pertaining to content data that has or has not been correctly received.

6. The method of claim 5, further comprising the each of the plurality of clients receiving information to reconstruct the content data from the contacted proxy server.

7. The method of claim 1, further comprising the each of the plurality of clients sending to the contacted proxy a notification that the content data was either successfully or unsuccessfully received or reconstructed.

8. The method of claim 1, further comprising the each of the plurality of clients sending to the contacted proxy server data pertaining to one or more responses by the each of the plurality of clients to prompts within the content data, the prompts being related to voting or purchase of an object or service.

9. The method of claim 1, further comprising the each of the plurality of clients sending, to the contacted proxy server, a request to obtain additional content data identified by a uniform resource locator (URL) within the broadcasted content data.

10. The method of claim 1, further comprising the each of the plurality of clients providing, by the broadcaster, to each of the proxy servers at least a portion of the content data.

11. The method of claim 1, wherein information associated with the available proxy servers is embedded in the broadcast content data as side information.

12. The method of claim 1, wherein information associated with contact intervals for each available proxy server is embedded in the broadcast content data as side information.

13. An apparatus for broadcasting content data to a plurality of clients, the apparatus comprising:

a content data acquisition unit for acquiring content data for broadcast;

a determination unit for determining a list of a plurality of available proxy servers which may be contacted by the each client for post-processing, the plurality of available proxy servers having received information, from the broadcaster, to handle any of the post-processing transactions from the each client; and a broadcast unit for broadcasting the content data to the plurality of clients, along with the list of the plurality of available proxy servers that may be contacted for post processing to permit the plurality of clients to randomly select a proxy server for post-processing.

14. The apparatus of claim 13, wherein the determination unit further determines contact intervals for each of the available proxy servers specifying the time period in which the proxy servers may be contacted after the broadcast; and the broadcast unit further broadcasts the contact intervals for each of the available proxy servers to permit the client to randomly select a delay time t within the contact interval in which to contact to selected proxy server for post-processing.

15. The apparatus of claim 13, wherein the determination unit further determines one or more post-processing transactions that may be initiated by the each of the plurality of clients.

* * * * *

UNITED STATES PATENT AND TRADEMARK OFFICE
CERTIFICATE OF CORRECTION

PATENT NO. : 9,049,035 B2  
APPLICATION NO. : 13/418673  
DATED : June 2, 2015  
INVENTOR(S) : Lohmar et al.

Page 1 of 1

It is certified that error appears in the above-identified patent and that said Letters Patent is hereby corrected as shown below:

On the Title Page, in Item (73), under "Assignee", in Column 1, Line 1, delete "Erisson" and insert -- Ericsson --, therefor.

In the Specification

In Column 6, Line 16, delete "mediction" and insert -- mediation --, therefor.

In Column 7, Line 19, delete "of is" and insert -- of --, therefor.

In Column 7, Line 65, delete "to is" and insert -- to --, therefor.

Signed and Sealed this  
Twenty-sixth Day of April, 2016

Michelle K. Lee  
*Director of the United States Patent and Trademark Office*